United States Patent
Matsushima et al.

(10) Patent No.: US 6,937,799 B2
(45) Date of Patent: Aug. 30, 2005

(54) OPTICAL TRANSMISSION MODULE AND OPTICAL COMMUNICATION SYSTEM USING THE SAME

(75) Inventors: Naoki Matsushima, Yokohama (JP); Kazumi Kawamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 394 days.

(21) Appl. No.: 09/793,923

(22) Filed: Feb. 28, 2001

(65) Prior Publication Data

US 2001/0036338 A1 Nov. 1, 2001

(30) Foreign Application Priority Data

Apr. 20, 2000 (JP) .......................... 2000-126230

(51) Int. Cl.[7] .............................................. G02B 6/26
(52) U.S. Cl. ........................... 385/50; 385/88; 385/129
(58) Field of Search .............................. 385/14, 15, 27, 385/31, 39, 43, 50, 129–132, 88, 89, 28

(56) References Cited

U.S. PATENT DOCUMENTS

| | | | | |
|---|---|---|---|---|
| 3,894,789 A | * | 7/1975 | Kobayashi et al. ........... 385/34 |
| 5,175,788 A | * | 12/1992 | Miura et al. ................. 385/131 |
| 5,446,820 A | * | 8/1995 | Ishikawa et al. ............. 385/123 |
| 5,577,141 A | * | 11/1996 | Adar et al. ..................... 385/43 |
| 5,859,942 A | * | 1/1999 | Ueda ............................. 385/49 |
| 6,049,643 A | * | 4/2000 | Lee et al. ...................... 385/28 |
| 6,112,002 A | * | 8/2000 | Tabuchi ........................ 385/50 |
| 6,219,366 B1 | * | 4/2001 | Furushima .................... 372/50 |
| 6,289,157 B1 | * | 9/2001 | Kawamoto et al. ......... 385/123 |
| 6,293,688 B1 | * | 9/2001 | Deacon ....................... 362/556 |
| 6,393,186 B1 | * | 5/2002 | Deacon ........................ 385/50 |

FOREIGN PATENT DOCUMENTS

| | | |
|---|---|---|
| JP | 05-249331 | 9/1993 |
| JP | 2000-214340 | 9/2001 |

OTHER PUBLICATIONS

*Journal of Lightwave Technology*, vol. 16, No. 9 (Sep. 1998).

* cited by examiner

*Primary Examiner*—Juliana K. Kang
(74) *Attorney, Agent, or Firm*—Antonelli, Terry, Stout & Kraus, LLP

(57) ABSTRACT

A beam spot size enlarger waveguide for enlarging the beam spot size is connected to a beam spot size reducer waveguide for shrinking the beam spot size, along with the direction of the propagation of light beam; or the beam spot size enlarger waveguide, a beam spot size maintainer waveguide for maintaining the beam spot size constantly, and the beam spot size reducer waveguide are connected in the direction of the propagation of light beam.

18 Claims, 6 Drawing Sheets

OPTICAL TRANSMISSION MODULE AND OPTICAL COMMUNICATION SYSTEM USING THE SAME

BACKGROUND OF THE INVENTION

1. Field of the Invention

The present invention relates to an optical transmitter module used primarily in an optical transmission system or in an optical switching system (both referred to as an optical communication system) and more particularly to an optical connecting technology used for connecting a light emitting or receiving element with optical fibers in the optical transmission module, or a light emitting or receiving element with an optical circuit, as well as an optical circuit with optical fibers.

2. Description of the Prior Art

Construction of communication lines using optical fibers is projected not only among office buildings of a variety of industries but also among condominiums and residences, as the optical technology of communication develops. One of problems concerned is the cost of the optical transmission system, in particular the rate of lowering the cost of optical modules that reach to the subscribers. In the prior art, an optical lens has been usually inserted between an optical element such as semiconductor laser and an optical fiber or an optical waveguide, in order to increase the optical coupling efficiency. This approach of providing a lens between an optical element and a waveguide has many drawbacks, for lowering the cost of optical modules for subscribers, such as increased number of parts, alignment required between three independent members, and consequently a complex work to mate them. In order to solve these problems, for example, as disclosed in Japanese Unexamined Patent Publication No. H5-249331 and Japanese Unexamined Patent Publication No. 2000-214340, a semiconductor laser integrated with a beam spot size converter has been devised and developed to make practicable.

To explain this type of semiconductor laser having a converter of spot radius of beams, a way for determining the coupling efficiency of light beam will be described now by referring to a schematic diagram of binding between a semiconductor laser and a light waveguide in FIG. 10. Now the light beam is assumed to be a Gaussian beam. The coupling between two 0th order Gaussian beams will be considered here, as in an optical communication, the waveguide mode of beam in many cases is in single mode. The coupling efficiency $\eta$ may be given by the following equation:

$$\eta = \kappa \exp\left\{-\kappa \frac{x^2}{2}\left(\frac{1}{W_1^2} + \frac{1}{W_2^2}\right)\right\} \quad [\text{eq. 1}]$$

where beam spot sizes (the radius that the amplitude of a Gaussian beam becomes $1/e$ of the median value) in each of beam waists of a semiconductor laser 23 and a waveguide 22 (where the radius of curvature of the wavefront of Gaussian beams is infinite) are W1 and W2 respectively, Z is the distance between these beam waists, X is the offset in the direction perpendicular to the optical axis, $\lambda$ is the wavelength of beam to be carried. In the equation above, $\kappa$ may be given by:

$$\kappa = \frac{4}{\left(\frac{W_1}{W_2} + \frac{w_2}{w_1}\right)^2 + \left(\frac{\lambda z}{\pi W_1 W_2}\right)^2} \quad [\text{eq. 2}]$$

From the above equations, the tolerance with respect to the coupling efficiency and axial offset will be improved when (1) W1=W2, and (2) these values becomes as large as possible.

The beam spot size W1 of a conventional semiconductor laser 23, in other words the incident beam spot size W1 is much smaller when compared with the beam spot size W2 of the optical fiber or waveguide 22 so that W1 will not be equal to W2. It can be concluded that the coupling efficiency will be good.

The semiconductor laser integrated with the attachment of a beam spot size converter has an effect to approaching W1 to W2 by enlarging W1 in order to improve the coupling efficiency and tolerance as a result.

However, a semiconductor laser integrated with the attachment of a beam spot size converter is constructed by using selective crystalline growth technology in order to tapering the film thickness at the emitting end of a core. The integration of beam spot size converter may affect the optimum design of the laser used, or the sensitivity of laser characteristics with respect to the construction error. As a consequence the conventional laser system has an insufficient yield, which pushed up the price of laser elements and finally a considerable reduction of cost of the optical modules is not yet achieved.

The enlargement of beam spot size by tapering by the selective crystalline growth method is limited to, at present, approximately 10 degrees when expressed by the angle of divergence of far field image when approximating a Gaussian beam. When taking into consideration the fact that the divergence of optical fibers is in the order of approximately 5 degrees, the difference between these two is still large. Even when using a semiconductor laser with a beam spot size expander converter, an innovative technology of a novel coupling scheme in combination therewith is needed in order to achieve a higher optical coupling efficiency along with ease of construction.

There is, needless to say, other approaches to solve the problem by the Prior Art. One solution is to incorporate an optical lens between a semiconductor laser and a waveguide. However, this solution may result in an increase of the number of parts and a complex method of production so that the achievement of lowering cost of optical modules will be difficult.

SUMMARY OF THE INVENTION

Therefore a primary object of the present invention is to provide an optical transmission module and an optical communication system allowing the coupling efficiency between optical components to be improved.

A secondary object of the present invention is to provide an optical transmission module and an optical communication system which may improve at least one of either the coupling efficiency or the tolerance between optical components.

In order to achieve the primary object described above, the present invention comprises: a first optical waveguide for enlarging the spot size of light beam in the direction of propagation of the beam; and a second optical waveguide for shrinking the beam spot size of light beam enlarged by the first waveguide in the direction of beam propagation.

The present invention may also comprise: at least either of the first optical waveguide or the second optical waveguide including a plurality of cores formed in positions so as to propagate an optical beam in the direction of beam propagation.

The present invention may also comprise: when defining an optical axis in the propagation direction of the optical beam as z-axis, an optical axis in the vertical direction at an orthogonal section as x-axis, and an optical axis in the horizontal direction as y-axis, at least either of the first optical waveguide or the second optical waveguide including a plurality of cores formed so as to propagate an optical beam in the direction of Z axis; and the width in X axis or Y axis of at least part of the cores varying in the direction of Z axis.

In order to achieve the secondary object described above, the present invention comprises: a first optical waveguide for enlarging the spot size of an optical beam in the direction of propagation of the beam; a second optical waveguide for maintaining the beam spot size of optical beam enlarged by the first optical waveguide; and a third optical waveguide for shrinking the beam spot size of optical beam maintained by the second waveguide.

The expression "maintaining the beam spot size" means that a relation may be established in which the absolute value of the rate of change of the radius of beam spot with respect to the direction of propagation of optical beam in the second optical waveguide is less than the absolute value of the rate of change of the beam spot size with respect to the direction of propagation of optical beam in either one of first or third optical waveguide. More specifically, the relation may be such that the absolute value of the rate of mean refractive index becomes less than 0.05% when a beam propagates 100 micrometers. Therefore if the value is larger, the beam spot is thought to be enlarged or shrunk.

The present invention may also comprise: at least either one of the first optical waveguide or the second optical waveguide or the third optical waveguide including a plurality of cores formed in positions so as to propagate an optical beam in the direction of beam propagation.

The present invention may further comprise: when defining an optical axis in the propagation direction of the optical beam as z-axis, an optical axis in the vertical direction at an orthogonal section as x-axis, and an optical axis in the horizontal direction as y-axis, at least either one of the first optical waveguide or the second optical waveguide or the third optical waveguide including a plurality of cores formed in position so as to propagate an optical beam in the direction of Z axis; and the width in X axis or Y axis of at least part of the cores varying in the direction of Z axis.

In the arrangements as have been described above, a cladding having a lower index of refraction than the cores is layered, formed between cores in the direction of optical beam propagation.

DETAILED DESCRIPTION OF THE PREFERRED EMBODIMENTS

Figure 1:
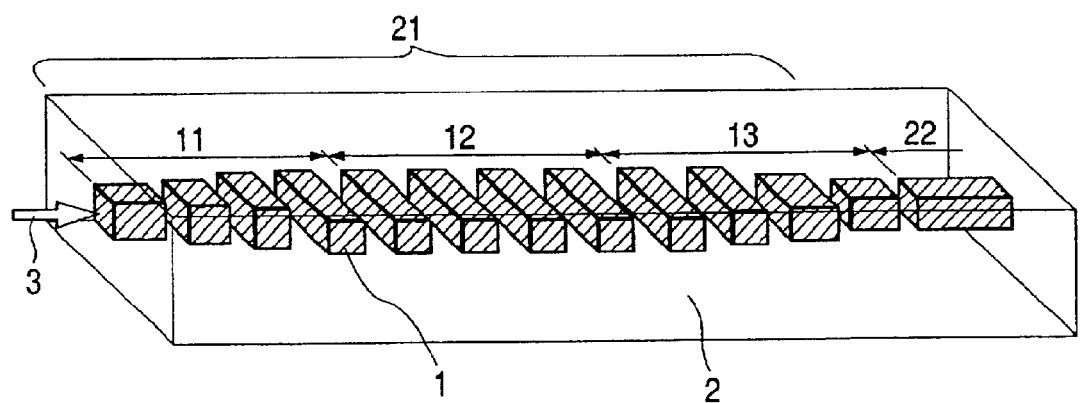
FIG. 1 is a perspective view of a first preferred embodiment of beam spot converting waveguide in accordance with the present invention.

A detailed description of one preferred embodiment embodying the present invention will now be given referring to the accompanying drawings. Now referring to FIG. 8 the principle of the present invention will be described.

In FIG. 8, reference numeral 23 designates to an light emitting element such as a semiconductor laser, reference numeral 21 to a beam spot size converter waveguide for enlarging then shrinking the beam spot size, or for enlarging and maintaining then shrinking the beam spot size, reference numeral 22 to a waveguide that propagates the optical beam having the beam spot size converted by the beam spot size converter waveguide 21.

Figure 8A:
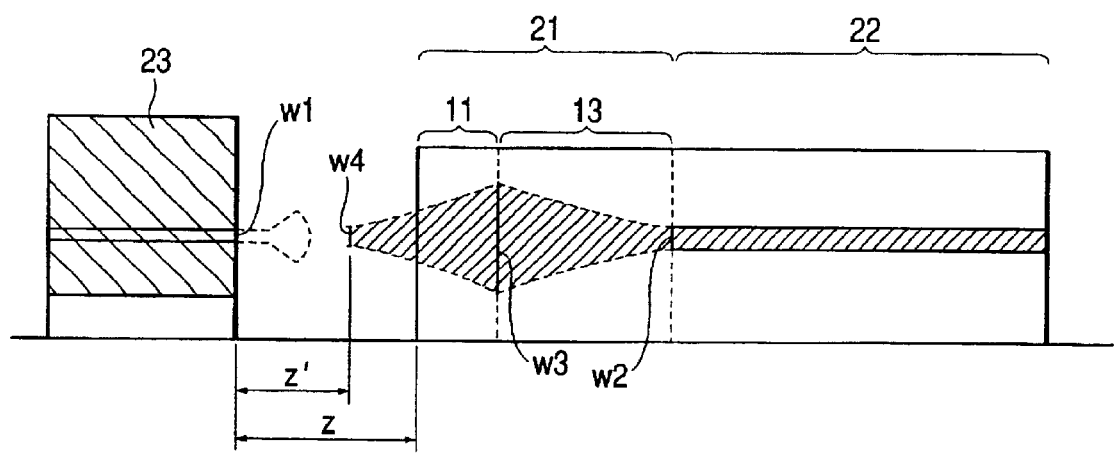
FIG. 8 is a schematic diagram illustrating the change in the beam spot size in a beam spot converting waveguide in accordance with the present invention.

The beam spot size converter waveguide 21 in FIG. 8(a) includes a beam spot size enlarger waveguide 11 for enlarging the beam spot size to propagate the beam, and a beam spot size reducer waveguide 13 for shrinking the beam spot size to propagate the beam. The beam emitted from the light emitting element 23 such as a semiconductor laser will have the beam spot size enlarged by the beam spot size enlarger waveguide 11. Then the spot size-enlarged beam will have the beam spot size shrunk by the beam spot size reducer waveguide 13 to emit into the light waveguide that follows.

Figure 8B:
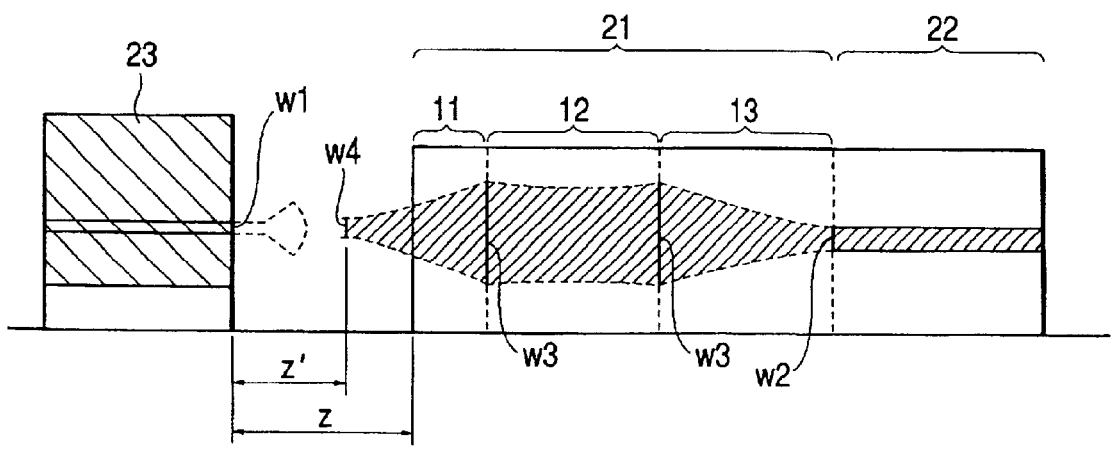

The beam spot size converter waveguide 21 in FIG. 8(b), on the other hand, includes a beam spot size enlarger waveguide 11 for enlarging the beam spot size to propagate the beam, a beam spot size maintainer waveguide 12 for maintaining the beam spot size at an approximate size to propagate the beam, and a beam spot size reducer waveguide 13 for shrinking the beam spot size to propagate the beam. In this example, the beam having the beam spot size enlarged by the beam spot size enlarger waveguide 11 will have the beam spot size maintained at the same spot size in the beam spot size maintainer waveguide 12. The beam spot radius reducer waveguide 13 then will shrink the beam spot size to propagate into the waveguide that follows.

Now considering an incident light beam from the waveguide 22 (the principle of reciprocity predicts no change in the coupling efficiency when the direction of incident beam is reversed).

In the module shown in FIG. 8(a), assuming that the beam propagated by the waveguide 22 will have a beam spot size W2 at one end of the beam spot size converter waveguide 21 (the beam spot size reducer waveguide 13), when propagating in the beam spot size reducer waveguide 13, the beam will have the beam spot size enlarged to W3 at the interface of the beam spot size reducer waveguide 13 with the beam spot size enlarger waveguide 11. When propagating in the beam spot size enlarger waveguide 11 the beam then will have the beam spot size shrunk, and a beam waist will be formed at the position where z=z', at which position the beam spot size will become W4. More specifically, by incorporating the beam spot size converter waveguide 21, the beam spot size W2 of the beam propagated from the waveguide 22 may be changed to the beam spot size W4 of an arbitrary magnitude. When the light emitting element 23 or waveguide 22 has a characteristic such that the beam spot size W2 is to be larger than the beam spot size W1, the beam spot size converter waveguide 21 allows the beam spot size W2 to be converted to a beam spot size W4 that has a spot size approximately equal to the beam spot size W1, such that the beam spot size W1 may become at or around the beam spot size W4, resulting in an improvement of the coupling efficiency. This can be understood from the above-mentioned equations (1) and (2). The beam spot size converter waveguide 21 may also artificially displace the position of the formed beam waist W4 into a proximal position of the light emitting element 23, in other words it may shorten the distance of the beam waists from Z to Z', resulting in an improvement of the coupling efficiency. By using the beam spot size converter waveguide 21, in particular, it will be possible to artificially and apparently bring the beam waist W4 much closer to the light emitting element 23, beyond the physically possible limit of implementing the light emitting element 23 and the waveguide 22.

Similarly, in the optical module shown in FIG. 8(b), assuming that the beam propagated from the waveguide 22 has a beam spot size W2 at the end of beam spot size converter waveguide (beam spot size reducer waveguide 13), the beam propagating the beam spot size waveguide 13 will have the beam spot size enlarged to W3 at the interface of the beam spot size reducer waveguide 13 and beam spot size maintainer waveguide 12, then the beam will pass through the beam spot size maintainer waveguide 12 with the beam spot size maintained, to enter into the beam spot size enlarger waveguide 11. The beam spot size at the entrance of beam spot size enlarger waveguide 11 will be W3.

Thereafter, when propagating in the beam spot size enlarger waveguide 11 the beam spot size will be shrunk so as to form a beam waist at the position z=z', where the beam spot size will become W4. In other words, the architecture shown in FIG. 8(b) enables the conversion of the beam spot size W2 of the beam having propagated from the waveguide 22 to a give size of beam spot size W4, by incorporating the beam spot size converter waveguide 21, in a manner similar to that shown in FIG. 8(a). Therefore, When the light emitting element 23 or waveguide 22 has a characteristic such that the beam spot size W2 is to be larger than the beam spot size W1, the beam spot size converter waveguide 21 allows the beam spot size W2 to be converted to a beam spot size W4 that has a r size approximately equal to the beam spot size W1, such that the beam spot size W1 may become at or around the beam spot size W4, resulting in an improvement of the coupling efficiency.

As can be seen by those skilled in the art from the foregoing description, the coupling efficiency between a semiconductor laser 23 and the waveguide 22 can be determined by the beam spot sizes (W1 and W4) of respective beam waists as well as the distance Z' between two beam waists. This concludes that an improvement of coupling efficiency may be achieved by using the beam spot size converter waveguide 21 as have been described above to rearrange the beam spot size W2 to the beam spot size W4 that has approximately the same size as the beam spot size W1.

It is to be appreciated by those skilled in the art that as the beam spot size converter waveguide 21 as have been described above can be formed integral with the waveguide 22, there will not be a substantial discrepancy with the waveguide 22, without any problems associated with an increase of the number of parts or of the complex production.

It can be seen that there may be a case in which the coupling efficiency may be improved when no discrepancy of optical axis exists, depending on the value of the beam spot size W1 of the light emitting element 23, while on the other hand the tolerance with respect to the offset optical axis may decrease. This can be reliably avoided by providing an architecture incorporating the beam spot size maintainer waveguide 12 in the structure as shown in FIG. 8(b), in order to achieve the improvement of the coupling efficiency together with the tolerance, or the improvement of either one of the coupling efficiency or the tolerance along with the maintenance of the other.

The principle in accordance with the present invention will be described herein below with reference to FIG. 9.

Figure 9A:
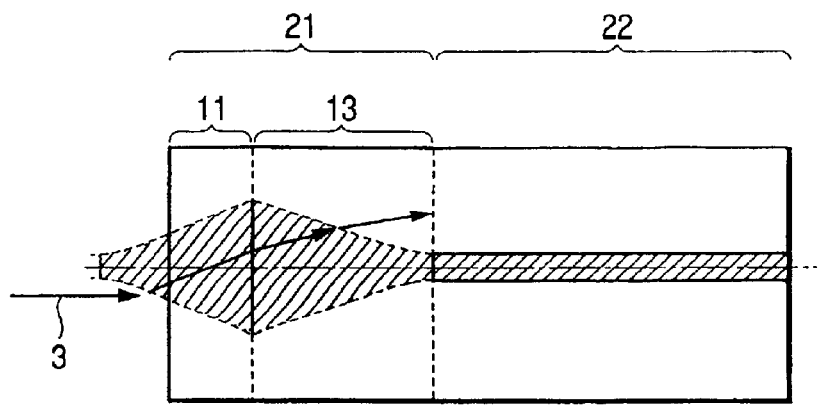
FIG. 9 is a schematic diagram illustrating the effect in accordance with the present invention of improved tolerance in the beam spot maintaining waveguide.

As shown in FIG. 9(a), when there is not a beam spot size maintainer waveguide 12, if the incident light beam 3 emitted from a semiconductor laser is running out by a parallel offset (without inclination), the beam having propagated through the beam spot size converter waveguide will have an inclination with respect to the optical axis of incident beam. The inclination leads to a disjunction from the proper axis along with the propagation of beam, resulting in a decrease of the intensity of light beam to be propagated to the waveguide 22. This indicates the degradation of tolerance with respect to the axial offset.

Figure 9B:
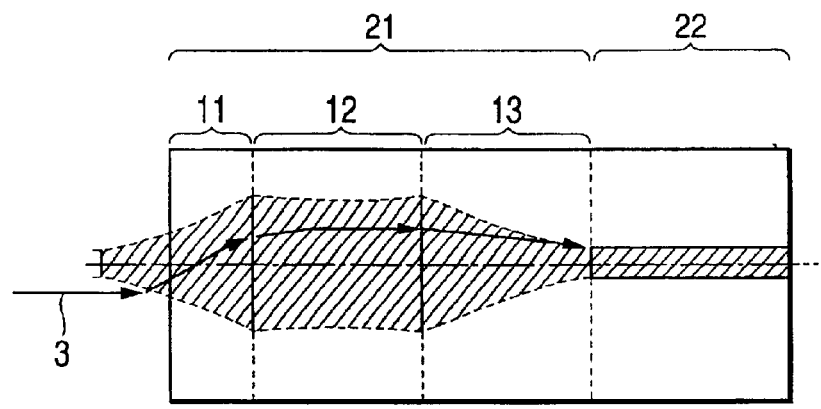
Figure 10:
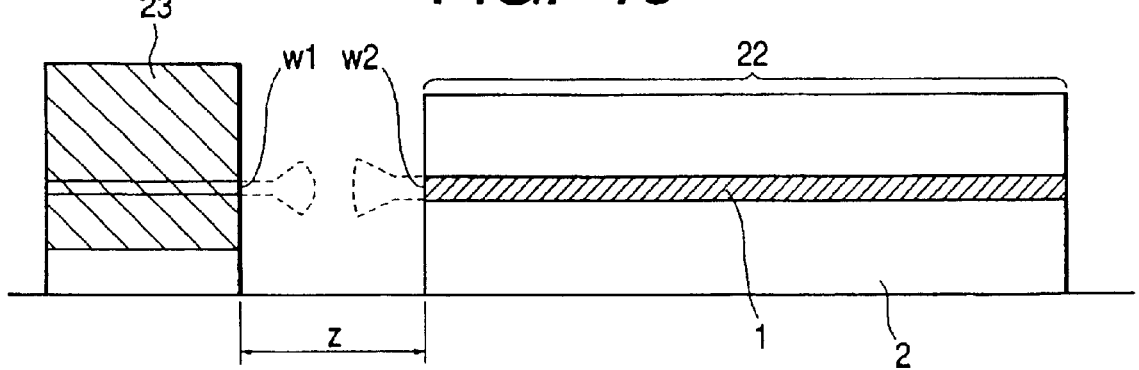
FIG. 10 is a schematic diagram illustrating the optical coupling in the Prior Art.

In contrast, as shown in FIG. 9(b), when there is a beam spot size maintainer waveguide 12, the light beam 3 having an inclination caused by the beam spot size enlarger waveguide 11 will be collimated by the beam spot size maintainer waveguide 12 so as to run into the proper, intrinsic direction of optical axis. After the compensation for the propagation direction, the beam will have the beam spot size shrunk by the beam spot size reducer waveguide 13 to the size of the waveguide 22 to propagate into the ahead waveguide 22. In other words, by incorporating the beam spot size maintainer waveguide 12, the propagation direction of an inclined beam can be compensated for and corrected to the proper, original propagation direction of the optical axis. This may suppress the degradation of coupling efficiency caused by the axial offset so as to improve the tolerance with respect to the axial discrepancy. With the tolerance improved with respect to the axial offset, the onboard precision of the light emitting element 23, namely the requirement of the precise coupling of axis to the waveguide (including the beam spot size converter waveguide 21) can be mitigated so as to facilitate the installation of light emitting element 23.

A typical example of the structure of the beam spot size converter waveguide 21 is shown in FIG. 1. For the sake of simplicity and clarity there are shown the beam spot size converter waveguide 21 and the waveguide 22 in FIG. 1.

In FIG. 1, reference numeral 1 denotes to a core that propagates beams, reference numeral 2 to a clad surrounding the core 1 that has a lower index of refraction than the core 1 (for example, given $\Delta n=(n1-n2)/n1\times 100$ [%], where n1 is the index of refraction of the core 1, and n2 is the index of refraction of the clad 2, it is preferable for $\Delta n$ to be in the range from 0.2 to 0.5%).

The reference numeral 3 is a beam propagating in the waveguide. The beam spot radius converter waveguide 21 is built incorporating the beam spot size enlarger waveguide 11, beam spot size maintainer waveguide 12, and beam spot size reducer waveguide 13.

In this embodiment, the difference in the refractive index of the core/cladding is altered in the direction of the propagation of light beam so as to enlarge or shrink the beam spot size.

The difference in the refractive index of the core/cladding indicates the difference between the mean index of refraction in a segment that combines the cores and claddings, and the index of refraction of the claddings surrounding the segment, in case in which the cores and claddings are alternately compiled in the direction of the propagation of light beam. If the cross-sectional area of the cores in the propagation direction of the light beam is equivalent, the smaller the difference of the core/cladding refractive index, the weaker the light enclosure is so that the beam spot size will be enlarged. The principle of segmented waveguide as a means of refractive index conversion that is adopted in the present embodiment will be described herein below.

Figure 7:
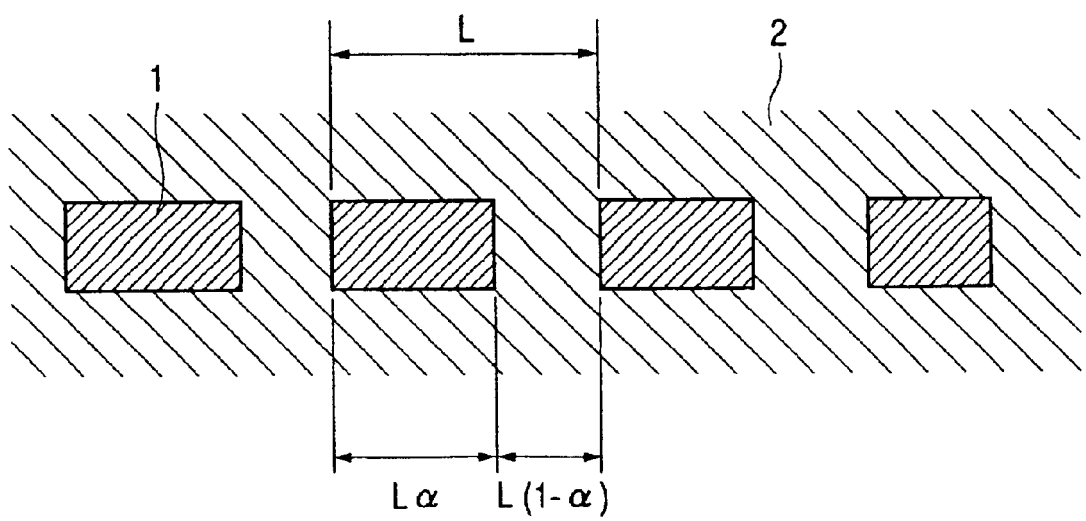
FIG. 7 is a schematic diagram of segmented waveguide.

FIG. 7 shows a schematic diagram of a segmented waveguide in accordance with the present invention.

A segmented waveguide in the direction of the propagation of light beam, includes a chain composed of a section with a core 1 that has a length and another section without a core 1 that immediately follows (i.e., a segment with a cladding 2). When considering the sum of the length of one core 1 with the length of one non-core as one unity length L, n1 is the index of refraction of the clad 2, n2 is the refractive index of the core 1, and α is the ratio of the core length to a unit length L, then the n' derived from the equation (1) can be thought of the mean index of refraction in a unit length L. Here a pair of one core 1 with a section without core 1 makes a segment.

$$n'=(1-\alpha)\cdot n1+\alpha\cdot n2 \qquad (1)$$

Thus by altering the ratio α of the length of the core 1 to the length of the cladding 2 in the direction of the propagation of light beam, the refractive index of the waveguide can be changed. This is the principle of the segmented waveguide as a means of conversion of the index of refraction.

The principle of the segmented waveguide may be applied to the optical module shown in FIG. 1, in which the ratio α of the core length of a segment in the beam spot size enlarger waveguide 11 and the beam spot size reducer waveguide 13 is tailored so as to linearly increase or decrease along with the direction of the propagation of light beam, in order to convert the beam spot size.

More specifically, as the cladding 2 is made of a material which allows the index of refraction n1 to be smaller than that of the core 1, the beam spot size enlarger waveguide 11 may be built such that the ratio of the core occupied in a segment in the direction of the propagation of light beam is decreasing while the segment length is invariable. The beam spot size reducer waveguide 13 may also be built such that the ratio of the core occupied in a segment in the direction of the propagation of light beam is increasing while the segment length is invariable.

Although not shown in the drawings, the beam spot size enlarger waveguide 11 can be such that the core length per se becomes shorter in the direction of the propagation of light beam, in each segment, provided that the gap between cores is nearly constant. In contrary, if the core length is kept nearly constant, the beam spot size enlarger waveguide 11 can be built such that the gap between cores becomes larger in the direction of the propagation of light beam in each segment.

The specific dimension of segments and core 1 in particular can be determined based on the beam spot size of the semiconductor laser used, which is not shown in the figure. It is preferable to design such that the propagation loss of the beam spot size converter waveguide 21 is not excessively larger. For example, a preferable dimension may be such that the segment frequency is 20 micrometers, the length of a core therein is in the range between 10 and 19 micrometers.

In the present embodiment, the beam spot size conversion is implemented by using a plurality of segments to achieve a gradual change, in order to avoid the conversion of light beam mode caused by an abrupt modification of beam spot size. For example, it is preferable that the mean index of refraction shifts by a nearly constant rate in the range of approximately 0.05 to 0.2% in the direction of the propagation of light beam when the light beam propagates a distance of 100 micrometers.

In the present embodiment, the width in the direction of y-axis of the segment is also altered. This is for the sake of reduction of the diffusion loss during the propagation by emitting beam into a next core. Here the width in the direction of y-axis of the segment needs to be altered in a range that the mode of propagation of the light beam is not modified. For example, in case of the propagation of only one single mode, the width Wy in the direction of y-axis, may be given by satisfying an inequality $$W_y \leq \frac{\lambda V_C}{\pi n' \sqrt{2\Delta n'}} \qquad [\text{eq. 3}]$$

where n' is the mean index of refraction of a segment, n2 is the index of refraction of the cladding, Δn'=(n'−n2)/n' is the difference between the mean index of refraction address the cladding index of refraction (Vc=2.4048, a cutoff V value).

The beam spot size maintainer waveguide 12 may be built so as to maintain a nearly constant beam spot size with an invariable α. The end of the beam spot size maintainer waveguide 12 have preferably a beam spot size identical to the end of the beam spot size enlarger waveguide 11 and the beam spot size reducer waveguide 13 so as not to induce coupling loss, however it needs necessarily not to be fixed to a dimension under the condition that the propagation loss stays small.

The aspect of beam spot size conversion of light beam in the structure described above was simulated by the beam propagation method (BPM). Constants were as follows: the index of refraction of the core 1 n2=1.46416, the index of refraction of the cladding 2 n1=1.4576, wavelength λ=1.31 micrometers. The cross-section of the waveguide 22 connected to the beam spot size converter waveguide 21 is 6.5 micrometers square.

Figure 5:
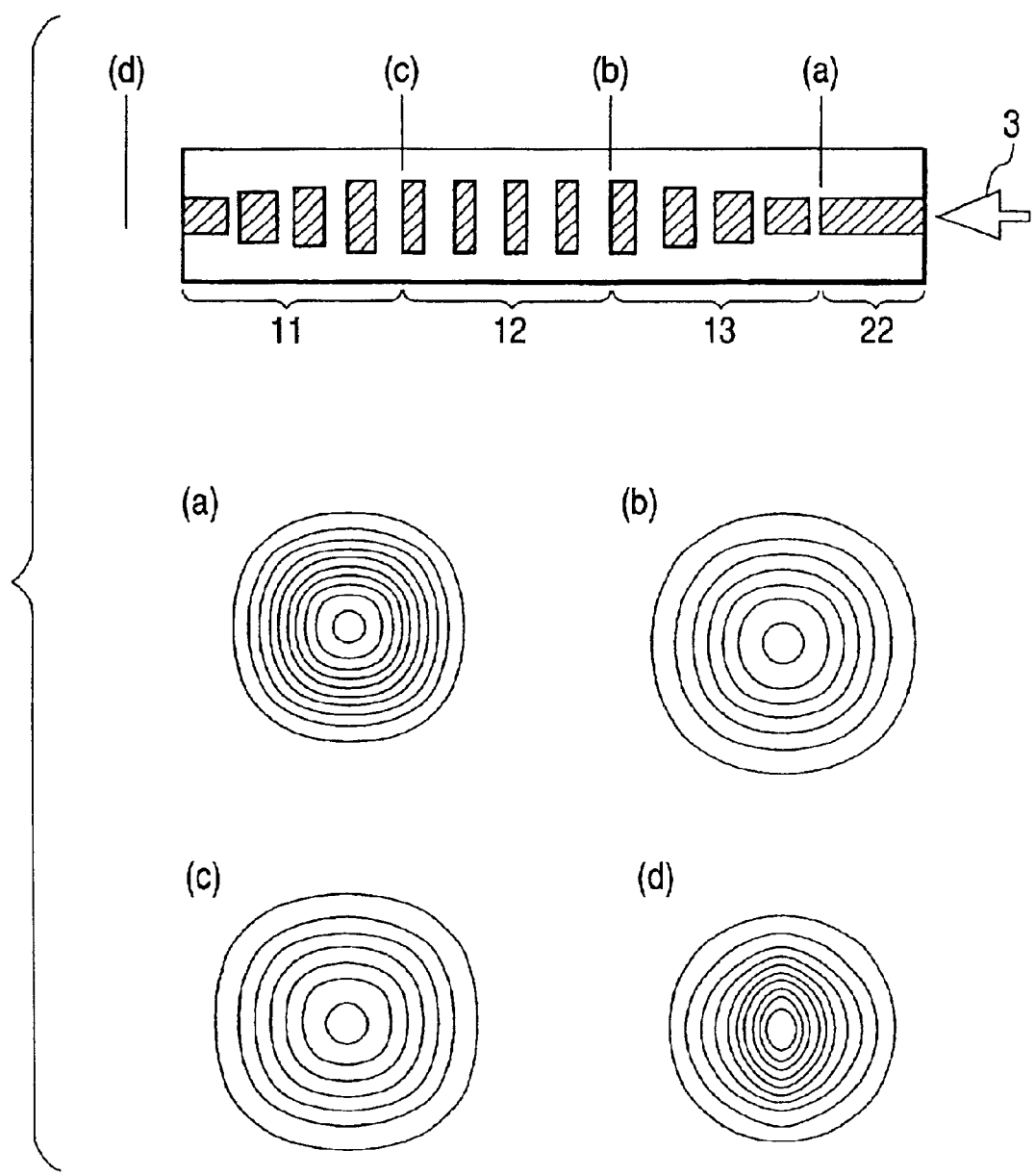
FIG. 5 is a chart showing the change in the beam spot size in a first preferred embodiment of beam spot converting waveguide in accordance with the present invention.

The result of simulation is shown in FIG. 5, which depicts an aspect in which the beam spot shape of the light beam 3 incident from the waveguide 22 is converted by the beam spot size converter waveguides 11, 12 and 13. In FIG. 5, (a) is the shape at the entrance of a beam spot size converter waveguide, namely the shape of the beam spot propagating in the waveguide 22. (b) is the shape on the connection of the beam spot size reducer waveguide 13 with the beam spot size maintainer waveguide 12, where it can be seen that the beam spot size is enlarged. (c) is the shape of the beam spot on the connection of the beam spot size maintainer waveguide 12 with the beam spot size enlarger waveguide 11, where the shape of (b) is almost maintained. Finally (d) is the shape of beam spot ahead of the beam spot size enlarger waveguide 11.

As can be appreciated from the above result of simulation, (d) is the beam spot size smaller than (a), indicating that the beam spot size is converted by the beam spot size converter waveguide 21.

Now referring to FIG. 4, the manufacturing steps for forming the beam spot size converter waveguide 21 integrated with the waveguide 22 will be described in greater details herein below.

At first, a Si substrate 31 is provided (step (a)).

Then first cladding layer 32 and a core layer 33 are deposited on the Si substrate 31, as glass particles obtained by heating hydrolysis of materials in oxygen-hydrogen flame (step (b)).

The core layer 33 has a higher concentration of dopant such as titanium oxide and germanium oxide. This process is referred to as a flame hydrolysis deposition, well known in the art as a production method of quartz waveguides. Thereafter the film of glass particles will be heated in an electric furnace to a high temperature to transparentize (step (b)).

Next, The core patterns for the beam spot size converter waveguide 21 and the waveguide 22 connected thereto will be formed simultaneously on the core layer 33, by means of usual photolithography. For example, after applying some resist and transferring a mask pattern, the layer will be etched to a predetermined depth by RIE (reactive ion etching) to form the core patterns (step (c)).

Second cladding layer 34 with the amount of dopant adjusted so as to yield a lower index of refraction than the core layer 33 will be deposited thereon as glass particles, and then the substrate will be heated to a high temperature to transparentize (step (d)). When a quartz material is used, a trace amount of dopant(s) is often added to assist to adjust the temperature of glass softening and the coefficient of thermal expansion. For the core and cladding other materials including but not limited to polymers may also be used instead of quartz glass provided that the light in the wavelength band used can be transmitted and that the index of refraction can be fine tuned.

The above steps will form integrally the beam spot size converter waveguide 21 with the waveguide 22 connected thereto. Since the beam spot size converter waveguide 21 can be formed integrated with the waveguide 22, there will be no substantial offset with the waveguide, without any problems associated with an increase of the number of parts or of the complex production. It is needless to say that the above-cited manufacturing steps may also be applied to the structure of following embodiments as well.

Figure 2:
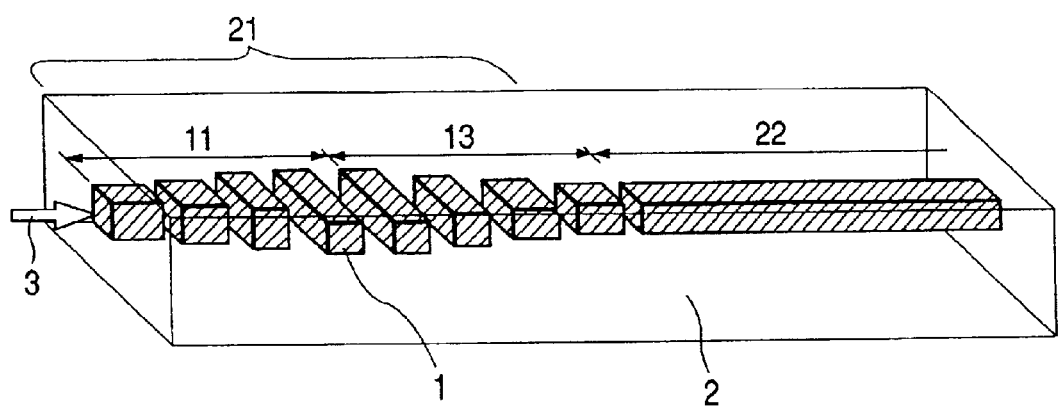
FIG. 2 is a perspective view of a second preferred embodiment of beam spot converting waveguide in accordance with the present invention.

Another preferred embodiment in accordance with the present invention will be described in greater details by referring to FIG. 2.

In the figure, the beam spot size converter waveguide 21 is different from the first preferred embodiment as have been described above, in that it is composed of the beam spot size enlarger waveguide 11 and the beam spot size reducer waveguide 13. The second embodiment also uses the segmented structure to linearly increase or decrease the ratio α of the core length in a segment in the direction of the propagation of light beam, as well as the width of a segment in the direction of y-axis, in order to convert the beam spot size.

In accordance with the structure of this preferred embodiment, the beam spot size maintainer waveguide 12 is omitted to save spaces to make the waveguide smaller than the first preferred embodiment described above, while having an effect that suppresses the light beam loss during propagation. It is also needless to say that the coupling efficiency will be increased when compared to the prior art.

Figure 6:
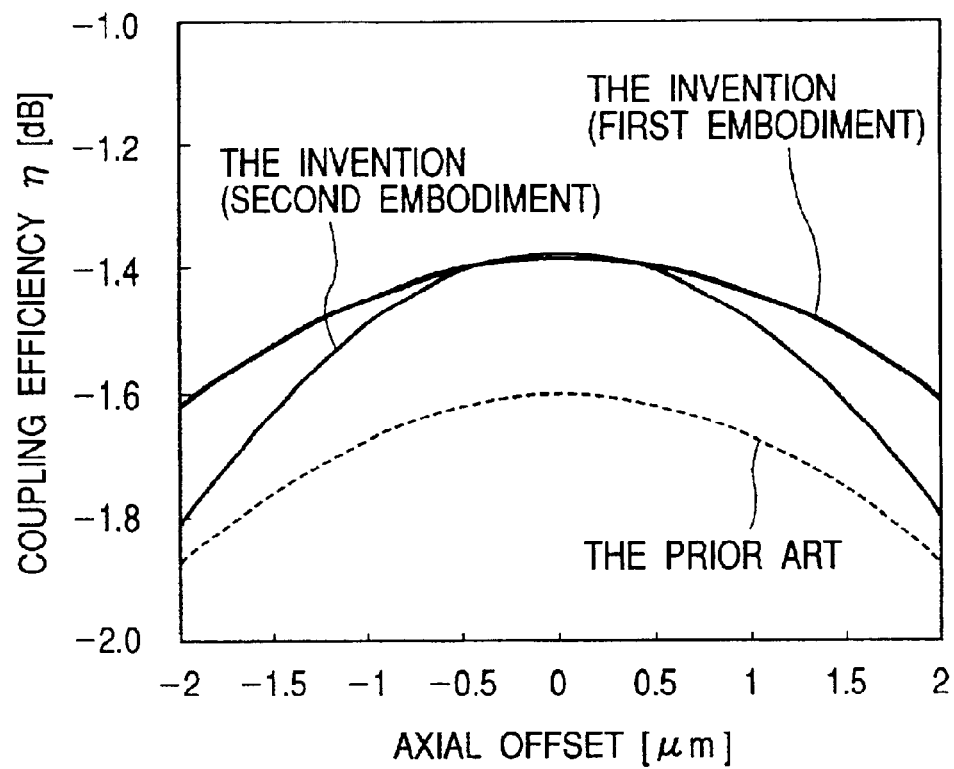
FIG. 6 is a chart showing the coupling efficiency and tolerance of axial offset in the first and second preferred embodiments of beam spot converting waveguide in accordance with the present invention and the Prior Art.

FIG. 6 shows a graph illustrating the coupling efficiency and the tolerance between a semiconductor laser and a waveguide, implemented by using the beam spot size converter waveguide 11 of the second preferred embodiment of the present invention. In the graph of FIG. 6 there is also shown a result for the sake of comparison when the beam spot size converter waveguide is not used. The graph is based on the results obtained by the simulation in the beam propagation method (BPM), as similar to FIG. 5.

As can be clearly seen from the figure, with the structure in accordance with first and second embodiments, the coupling efficiency will be increased. The tolerance with respect to the discrepancy in the vertical direction perpendicular to the optical axis is maintained at the same time, since a higher coupling efficiency than the Prior Art is obtained at 2 micrometers of offset. These results can be understood from the principle shown in FIG. 9.

Figure 3:
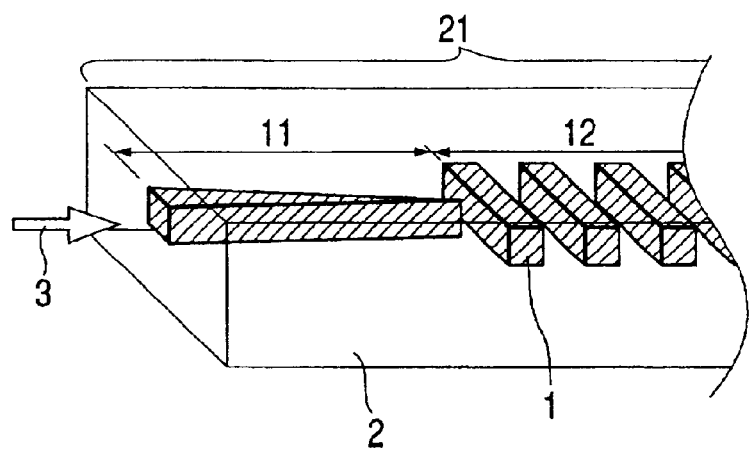
FIG. 3 is a perspective view of a third preferred embodiment of beam spot converting waveguide in accordance with the present invention.
Figure 4A:
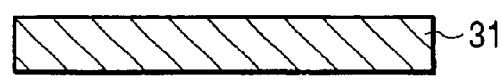
FIG. 4 is a cross-sectional view illustrating the steps in manufacturing process of a first preferred embodiment of beam spot converting waveguide in accordance with the present invention.
Figure 4B:
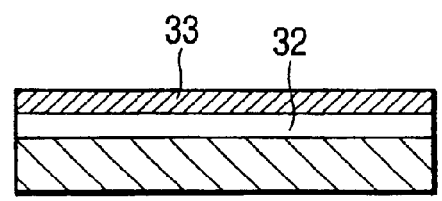
Figure 4C:
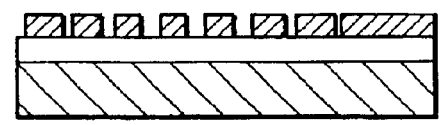
Figure 4D:
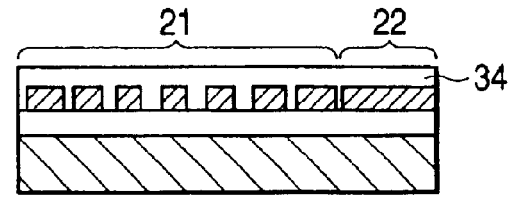

Next, still another embodiment in accordance with the present invention will be described in greater details below by reference to FIG. 3.

In this embodiment, another method of beam spot size conversion with respect to the beam spot size enlarger waveguide 11 is applied to modify the cross-sectional area of core along with the direction of the propagation of light beam. This method is applied to the beam spot radius converter waveguide 21 shown in FIG. 2, however this is equally applied to the waveguide shown in FIG. 1.

In the beam spot size enlarger waveguide 11 in accordance with the present embodiment, the cross-sectional area of the core is varied along with the direction of the propagation of light beam, i.e., tapered. The tapered shape is formed only in y-axis, namely in the direction of an axis in parallel to the substrate surface, while the shape is constant in the x-axis.

By using a tapered shape as shown in the figure, the beam spot size can be enlarged or shrunk in both x- and y-axis. When decreasing the cross-sectional area of core along with the direction of the propagation of light beam the beam spot size will be reduced to a certain level, and will be enlarged when further decreasing because of the light enclosed in the core will be weakened. Therefore, the beam spot size can be enlarged to a certain desirable size by adjusting the taper in the beam spot size enlarger waveguide 11.

A beam spot size converter waveguide of the shape thus formed may also alter the coupling efficiency. Thus, the coupling efficiency may be improved as similar to the foregoing embodiments, with the tolerance of the axial offset maintained.

The present invention may be embodied in other specific forms without departing from the spirit or essential characteristics thereof. For instance. For example, another method of converting difference in the index of refraction other than those cited above can be devised by using materials having different index of refraction. In such a method a new step for forming another layer of material different from and in addition to the core and the cladding (for forming a part having different index of refraction).

In brief, in accordance with the present invention, an optical module and optical communication system may be provided, which improves the coupling efficiency between optical parts. Also in accordance with the present invention, an optical module and optical communication system may be provided in which either of the coupling efficiency between optical parts or the tolerance may be improved.

What is claimed is:

1. An optical transmission module, comprising:
   a semiconductor laser for producing a light beam; and
   an optical waveguide optically coupled to the semiconductor laser, for guiding the light beam and controlling a spot size of the light beam along a propagation direction, the optical waveguide having a segmented structure comprising a plurality of successive segments arranged along the propagation direction of the light beam for optically coupling to the semiconductor laser, each segment having a core portion and a gap portion arranged to control the spot size of the light beam along the propagation direction such tat the spot size of the light beam is either enlarging gradually by plural segments and then shrinking gradually by plural segments, or enlarging gradually by plural segment, maintained at nearly constant size by plural segments and then shrinking gradually by plural segments.

2. An optical transmission module according to claim 1, wherein the optical waveguide is configured to propagate optical signals in a single mode.

3. An optical transmission module according to claim 1, wherein a ratio of the length of the core portion to the length of the gap portion in each segment is tailored so as to linearly increase or decrease along the propagation direction in order to control the spot size of the light beam.

4. An optical transmission module according to claim 3, wherein, within each segment, the core portion has a core refractive index and the gap portion has a gap refractive index lower than the core refractive index.

5. An optical transmission module according to claim 1, wherein the width of the core portion of each segment is varied along the propagation direction to adjust an index of refraction of the optical waveguide.

6. An optical transmission module according to claim 1, wherein the segmented structure is such that a selected one of the length of the core portion and the gap portion of each, segment is varied along the propagation direction of the light beam, while a non-selected one of the length of the core portion and the gap portion of said each segment is kept nearly constant along the propagation direction of the light beam.

7. An optical transmission module according to claim 6, wherein the distance between corresponding core portions on successive segments where the width of core portions adjoining each other along the propagation direction is relatively large, is longer than that between successive segments where the width of core portions adjoining each other along the propagation direction is relatively small.

8. An optical transmission module, comprising:
a semiconductor laser for producing a light beam;
an optical waveguide optically coupled to the semiconductor laser, for guiding the light beam and controlling a spot size of the light beam along a propagation direction; and
wherein the optical waveguide transmits a single mode optical signal, and has a segmented structure including a plurality of successive segments, each segment having a discrete core portion and a gap portion, and
wherein the plurality of successive segments serve as a beam spot size converter to adjust the spot size of the light beam that propagates along the propagation direction to have substantially the same spot size of the light beam received from the semiconductor laser, such that the spot size of the light beam is either enlarging gradually by plural segments and then shrinking gradually by plural segments, or enlarging gradually by plural segment, maintained at nearly constant size by plural segments and then shrinking gradually by plural segments, so as to reduce coupling loss and increase coupling efficiency between the optical waveguide and the semiconductor laser.

9. An optical transmission module according to claim 8, wherein a ratio of the length of the core portion to the length of the gap portion in each segment is tailored so as to linearly increase or decrease along the propagation direction in order to control the spot size of the light beam.

10. An optical transmission module according to claim 9, wherein, within each segment, the core portion has a core refractive index and the gap portion has a gap refractive index lower than the core refractive index.

11. An optical transmission module according to claim 9, wherein the width of the core portion of each segment is varied along the propagation direction in order to control the spot size of said light beam.

12. An optical transmission module according to claim 9, wherein the segmented structure is such that a selected one of the length of the core portion and the gap portion of each segment is varied along the propagation direction of the light beam, while a non-selected one of the length of the core portion and the gap portion of said each segment is kept nearly constant along the propagation direction of the light beam.

13. An optical transmission module according to claim 12, wherein the distance between corresponding core portions of successive segments where the width of core portions adjoining each other along the propagation direction is relatively large, is longer than that between successive segments where the width of core portions adjoining each other along the propagation direction is relatively small.

14. An optical transmission module, comprising:
a light emitting element for generating a light beam; and
an optical waveguide optically for guiding the light beam along a propagation direction, the optical waveguide comprising a first end portion disposed adjacent to, and optically coupled to receive the light beam from the light emitting element and to control the spot size of the light beam along a propagation direction, and a second end portion for guiding the light beam along the propagation direction,
wherein the first end portion has a plurality of successive segments arranged in the propagation direction, each segment comprising a core section and a gap section, in which the width of the core section of each segment is varied so as to control the spot size of the light beam along the propagation direction, and
wherein the plurality of successive segments serve as a beam spot size converter to adjust the spot size of the light beam, such that the spot size of the light beam is either enlarging gradually by plural segments and then shrinking gradually by plural segments, or enlarging gradually by plural segment, maintained at nearly constant size by plural segments and then shrinking gradually by plural segments, so as to provide the light beam to the second end portion for propagation along the propagation direction having substantially the same spot size of the light beam received from the light emitting element in order to reduce coupling loss and increase coupling efficiency between the optical waveguide and the light emitting element.

15. An optical transmission module according to claim 14, wherein, within each segment, the core portion has core refractive index and the gap portion has a gap refractive index lower than the core refractive index.

16. An optical transmission module according to claim 14, wherein a ratio of the length of the core portion to the length of the gap portion in each segment is tailored so as to linearly increase or decrease along the propagation direction in order to control the spot size of the light beam along the propagation direction.

17. An optical transmission module, comprising:

a light emitting element for generating a light beam; and an optical waveguide optically for guiding the light beam along a propagation direction, the optical waveguide comprising a first end portion disposed adjacent to, and optically coupled to receive the light beam from the light emitting element and to control the spot size of the light beam along a propagation direction, and a second end portion for guiding the light beam along the propagation direction, wherein the first end portion has a plurality of successive segments arranged in the propagation direction, each segment comprising a core section and a gap section, in which the width of the core section of each segment is varied so as to control the spot size of the light beam along the propagation direction, and wherein the plurality of successive segments include:

a first set of segments arranged to enlarge the spot size of the light beam received from the light emitting element in the propagation direction; and a second set of segments arranged to reduce the spot size of the light beam enlarged by the first set of segments in the propagation direction so as to match the spot size of the light beam as propagated through the second end portion with the spot size of the light beam received from the light emitting element.

18. An optical transmission module, comprising:

a light emitting element for generating a light beam; and an optical waveguide optically for guiding the light beam along a propagation direction, the optical waveguide comprising a first end portion disposed adjacent to, and optically coupled to receive the light beam from the light emitting element and to control the spot size of the light beam along a propagation direction, and a second end portion for guiding the light beam along the propagation direction, wherein the first end portion has a plurality of successive segments arranged in the propagation direction, each segment comprising a core section and a gap section, in which the width of the core section of each segment is varied so as to control the spot size of the light beam along the propagation direction, and wherein the plurality of successive segments include:

a first set of segments arranged to enlarge the spot size of the light beam received from the light emitting element in the propagation direction;

a second set of segments arranged to maintain the spot size of the light beam enlarged by the first set of segments in the propagation direction; and a third set of segments arranged to reduce the spot size of the light beam maintained by the second set of segments in the propagation direction so as to match the spot size of the light beam as propagated through the second end portion with the spot size of the light beam received from the light emitting element.

* * * * *